United States Patent [19]
Huss

[11] Patent Number: 5,343,755
[45] Date of Patent: Sep. 6, 1994

[54] STRAIN GAGE SENSOR WITH INTEGRAL TEMPERATURE SIGNAL

[75] Inventor: Charles G. Huss, Shakopee, Minn.

[73] Assignee: Rosemount Inc., Eden Prairie, Minn.

[21] Appl. No.: 57,745

[22] Filed: May 5, 1993

[51] Int. Cl.$^5$ .......................... G01L 19/04; G01B 7/16
[52] U.S. Cl. ........................................ 73/708; 73/766
[58] Field of Search ................. 73/708, 719, 720, 721, 73/725, 726, 727, 766; 338/3, 4; 374/143

[56] References Cited

U.S. PATENT DOCUMENTS

| | | | |
|---|---|---|---|
| 2,458,354 | 1/1949 | DeForest | 201/63 |
| 2,544,567 | 3/1951 | Rundell | 201/63 |
| 2,663,781 | 12/1953 | Rundell | 201/63 |
| 2,930,224 | 3/1960 | Bodner et al. | 73/88.5 |
| 3,230,774 | 1/1966 | Ostrow | 73/368.7 |
| 4,174,639 | 11/1979 | Raven | 73/766 |
| 4,202,218 | 5/1980 | Romo | 73/766 |
| 4,233,848 | 11/1980 | Sato et al. | 73/727 |
| 4,276,776 | 7/1981 | Lapeyre | 73/363.7 |
| 4,299,130 | 11/1981 | Koneval | 73/766 |
| 4,300,395 | 11/1981 | Shirouzu et al. | 73/708 |
| 4,414,837 | 11/1983 | Bice et al. | 73/1 B |
| 4,432,247 | 2/1984 | Takeno et al. | 73/862.67 |
| 4,462,018 | 7/1984 | Yang et al. | 388/3 |
| 4,576,052 | 3/1986 | Sugiyama | 73/862.63 |
| 4,633,721 | 1/1987 | Nishiyama | 73/862.67 |
| 4,667,516 | 5/1987 | Schulz | 73/708 |
| 4,715,003 | 12/1987 | Keller et al. | 364/571 |
| 4,777,826 | 10/1988 | Rud, Jr. et al. | 73/708 |
| 4,798,093 | 1/1989 | Kenoun | 73/708 |
| 4,800,513 | 1/1989 | Deutsch | 364/571 |
| 4,813,272 | 3/1989 | Miyazaki et al. | 73/708 |
| 4,911,016 | 3/1990 | Miyazaki et al. | 73/766 |
| 5,024,101 | 6/1991 | Tanaka et al. | 73/766 |
| 5,042,307 | 8/1991 | Kato | 73/708 |
| 5,146,788 | 9/1992 | Raynes | 73/708 |
| 5,187,985 | 2/1993 | Nelson | 73/708 |

FOREIGN PATENT DOCUMENTS 58-123780 7/1983 Japan.

OTHER PUBLICATIONS

"Understanding Constant Voltage and Constant Current Excitation for Pressure Sensors," S. Weatherwax, *Sensym Handbook*, pp. 7-70 to 7-73.

"IC Sensor Signal Conditioning" R. Lee, *Sensym Handbook*, pp. 7-24 to 7-27.

"Strain-gage Load-cell Interface," *Transducer Interfacing Handbook*, pp. 190-191.

Primary Examiner—Richard E. Chilcot, Jr.
Assistant Examiner—William L. Oen
Attorney, Agent, or Firm—Westman, Champlin & Kelly

[57] ABSTRACT

A strain gage pressure sensor having a resistive bridge circuit from which is measured both the applied pressure and the temperature of the pressure sensor. A constant voltage is provided across the bridge circuit such that any temperature caused changes in the resistance of the bridge circuit are reflected in the flow of a bridge current through the bridge circuit. A sense resistor is electrically coupled to the bridge circuit such that any change in the bridge current causes a change in the voltage drop across the sense resistor. The voltage drop and the pressure output signal are digitized and suitably processed resulting in a highly accurate, corrected pressure output for use with suitable pressure instrumentation.

12 Claims, 3 Drawing Sheets

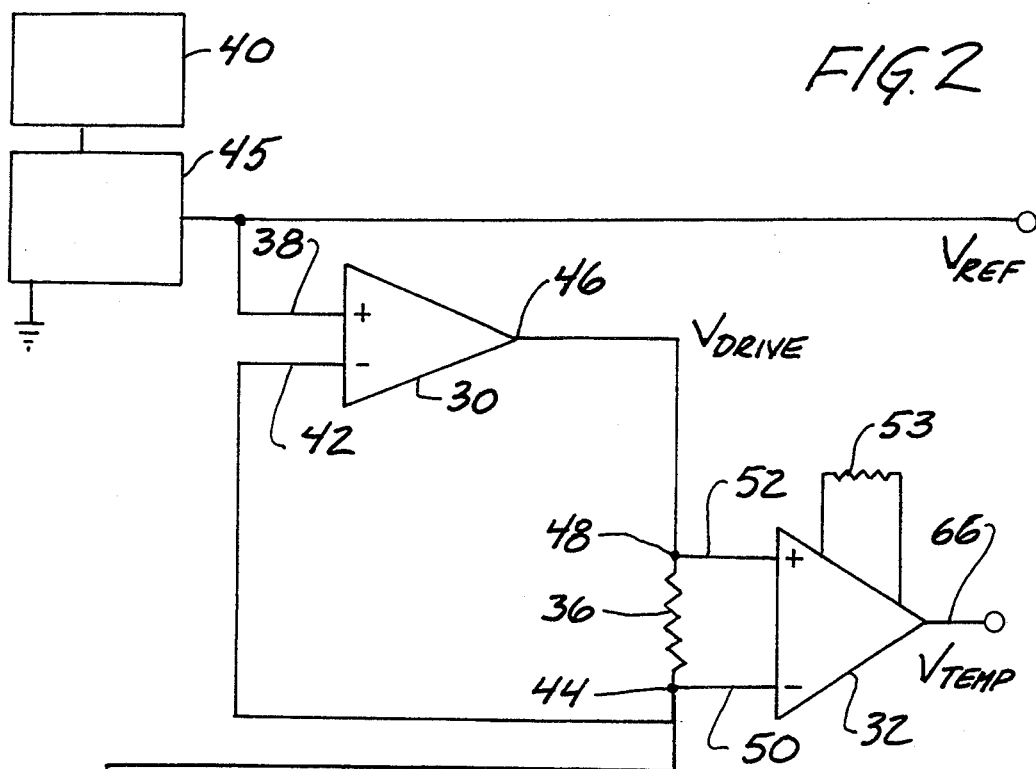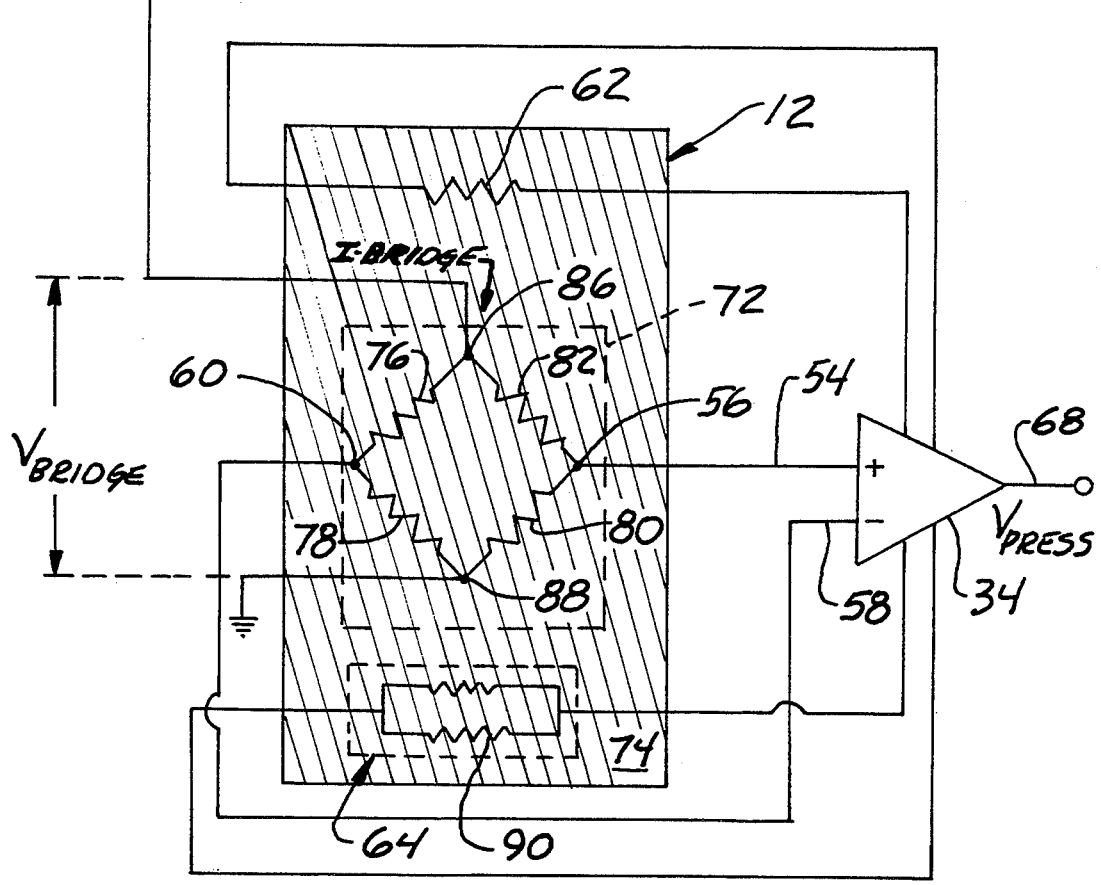
FIG. 2

STRAIN GAGE SENSOR WITH INTEGRAL TEMPERATURE SIGNAL

BACKGROUND OF THE INVENTION

The present invention relates to resistive strain gage pressure sensors and, in particular, to temperature compensation of such sensors.

Temperature changes in the operating environment of resistive pressure sensors produce significant errors in the pressure output signal of such sensors. Slight variations in the temperature coefficient of resistivity of a resistive bridge sensor causes an offset error and an apparent decrease in the flexibility of the diaphragm, thus causing a sensitivity error. Therefore, it is often necessary to compensate for temperature variations by measuring the temperature of the pressure sensor and correcting the pressure output signal.

Methods exist which partially correct temperature-induced errors in resistive pressure sensors. Many approaches use a separate temperature responsive element, for example a thermocouple, thermistor or diode. These elements measure a temperature near the pressure sensor and generate a correction signal dependent on the environmental conditions of the sensor. Other approaches involve selection of the thermal coefficients of the bridge circuit and temperature compensating elements, such as resistors, to integrally balance the bridge circuit.

A problem with such prior art approaches is that during dynamic conditions such as warmup, brief temperature excursions or other transient temperature conditions occur that often result in a phase lag between the pressure signal and temperature signal. Such a phase lag results from the non-perfect thermal coupling inherent between two separate electrical elements simultaneously receiving time-varying stimuli, such as temperature fluctuations which do not simultaneously reach and affect the temperature responsive element and the pressure sensor. Thus, error occurs in the correction of the pressure output signal.

SUMMARY OF THE INVENTION

The present invention provides a strain gage pressure sensor having a resistive bridge circuit which utilizes the current flowing through the bridge circuit to measure temperature variations and provide a temperature correction signal. The present invention uses relatively few electrical components and simultaneously produces from a single bridge circuit both an analog output signal, related to the pressure applied to the bridge and an analog output signal related to the temperature of the bridge.

The electrical components associated with the present invention include a resistive pressure sensor and signal processing circuitry including a sense resistor and three amplifiers, two of the amplifiers also utilize gain-setting resistors. A constant electrical potential across the bridge circuit ensures that thermally-induced changes in the bridge circuit resistance result in changes in the flow of the electrical current through the bridge circuit. The sense resistor electrically connects to the bridge circuit such that the electrical current through the bridge circuit flows through the sense resistor. Inherent coupling of the temperature and pressure output signals result from the bridge circuit serving as both a temperature and pressure sensing element.

Measurement and amplification of the drop in electrical potential across the sense resistor provides a temperature signal used to correct errors in the pressure output signal caused by temperature variations. Thereafter, application of known signal conditioning techniques permit highly accurate pressure measurements over a broad range of temperatures.

In one embodiment, dual resistors formed on the substrate of the pressure sensor, made of the same material and made at the same time as the resistors of the bridge circuit, permit compensation for temporal as well as temperature-induced variations in sensor sensitivity. These dual gain-setting resistors are coupled to a bridge circuit amplifier to fix a gain-setting ratio for the amplifier that, as a result of the common derivation of the resistors, does not vary with temperature. Furthermore, variations of batch production techniques of the sensor substrate do not impinge upon the accuracy of the pressure output signal of the present invention. This approach results in a highly interchangeable sensor design that does not require re-calibration or alteration of external signal processing circuitry after sensor failure and subsequent replacement, thereby resulting in substantial savings of time and money.

Many different types of pressure sensing applications will benefit from application of the present invention, including thin film strain gage sensors, particularly as disclosed in U.S. Pat. No. 4,777,826, assigned to the present assignee and hereby incorporated by reference.

BRIEF DESCRIPTION OF THE DRAWINGS

FIG. 2 is a schematic diagram of the pressure sensor coupled to the temperature compensating circuit of the present invention.

DESCRIPTION OF THE PREFERRED EMBODIMENTS

Figure 1:
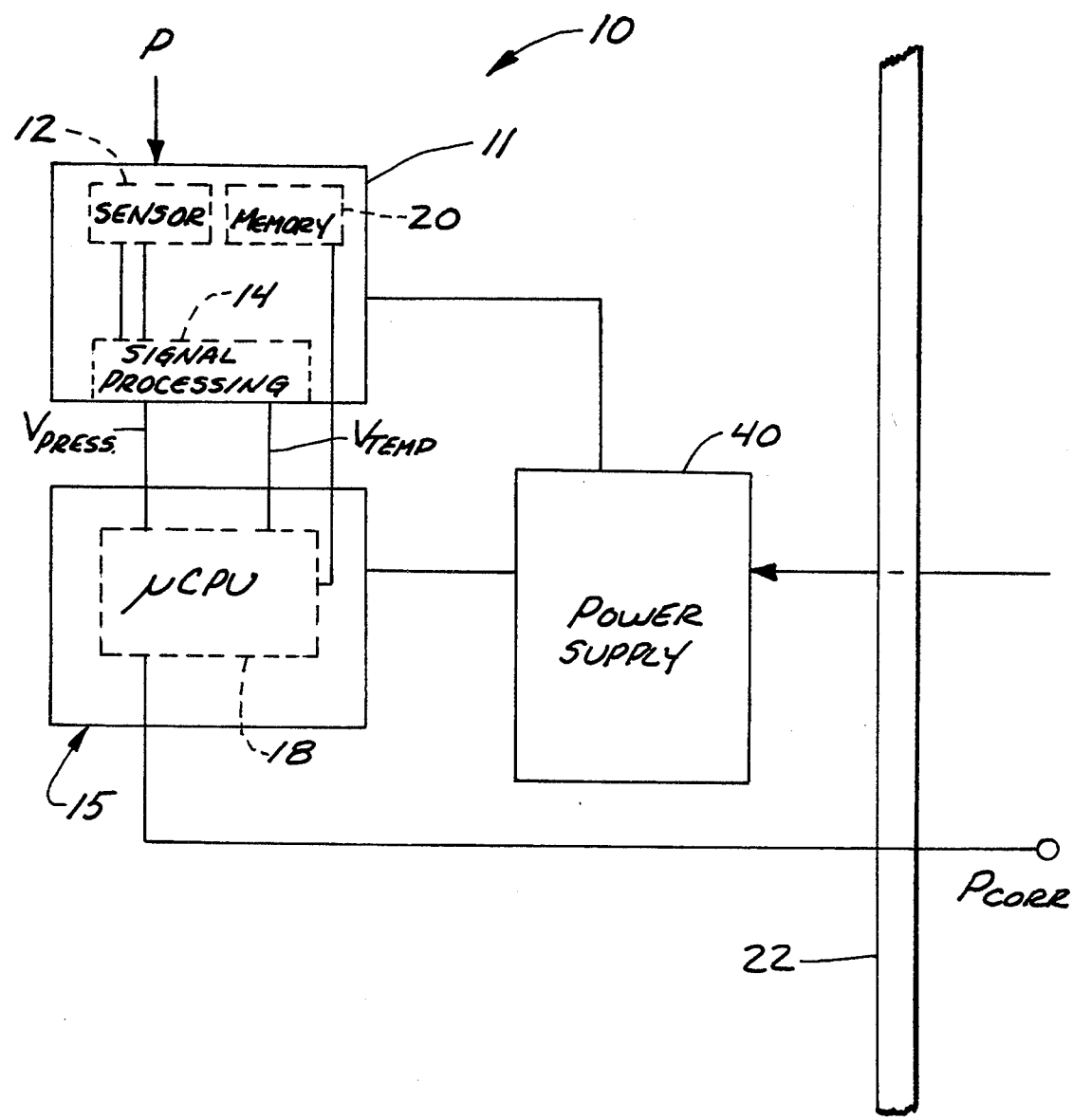
FIG. 1 is a functional block diagram of the pressure sensing and temperature compensating design of the present invention.

Shown schematically in FIG. 1, a pressure sensor circuit 10 of the present invention comprises a first circuit board 11 responsive to applied pressure, as designated by the letter "P". The first circuit board 11 contains a pressure sensor 12 coupled to signal processing circuitry 14 which in turn couples to a second circuit board 15 which includes microcomputer system 18. Microcomputer system 18 accesses pre-loaded pressure/temperature correction coefficients from a non-volatile memory 20 so that a digital output signal, $P_{corr}$, representative of actual applied pressure, results. In the embodiment shown, a suitable EMI filter 22 protects pressure sensor circuit 10 from undesired electromagnetic interference. Aerospace applications, such as the preferred embodiment herein, prescribe use of EMI filter 22. However, other suitable shielding such as a Faraday cage will suffice for other applications of the present invention.

Shown in FIG. 2, the signal processing circuitry 14 comprises a first amplifier 30, a second amplifier 32, a third amplifier 34 and a sense resistor 36. A non-inverting input 38 of the first amplifier 30 electrically couples to a voltage reference 45 while an inverting input 42 of the first amplifier 30 electrically couples to a first end 44 of the sense resistor 36. A power supply 40 provides a stable source of electrical energy to pressure sensor circuit 10. In the embodiment shown, the voltage reference 45 furthermore produces a stable electrical potential of 2.5 volts to pressure sensor circuit 10. An output 46 of the first amplifier 30 electrically couples to a second end 48 of the sense resistor 36. Amplifier 30 and sense resistor 36 couple to form an extremely stable voltage regulator circuit partly as a result of the precision and accuracy of the voltage reference device 45. The second amplifier 32, a differential amplifier, has an inverting input 50 electrically coupled to the first end 44 of the sense resistor 36 and a non-inverting input 52 electrically coupled to the second end 48 of the sense resistor 36. Amplifier 32 has a predetermined gain factor fixed by the value of a resistor 53.

The third amplifier 34, a differential amplifier, has a non-inverting input 54 electrically coupled to a first node 56 of the bridge circuit and an inverting input 58 electrically coupled to a second node 60 of the bridge circuit. Third amplifier 34 preferably is Analog Devices, Inc. part number AMP01/883 or similar suitable instrumentation quality amplifier that accommodates two gain-setting resistors for setting the amplifier gain to a multiple of the ratio of the two gain-setting resistances. Both a first gain-setting resistor 62 and a second gain-setting resistor 64 suitably couple to and set the gain of the third amplifier 34 according to the following equation: Gain=20($R_{62}/R_{64}$).

With reference to FIG. 1, an output 66 of the second amplifier 32 and an output 68 of the third amplifier 34 electrically couple to an analog-to-digital converter contained in the signal processing circuitry 14 and then to the microcomputer system 18. In addition, both the memory 20 and the power supply 40 are electrically coupled to the microcomputer system 18.

Figure 3:
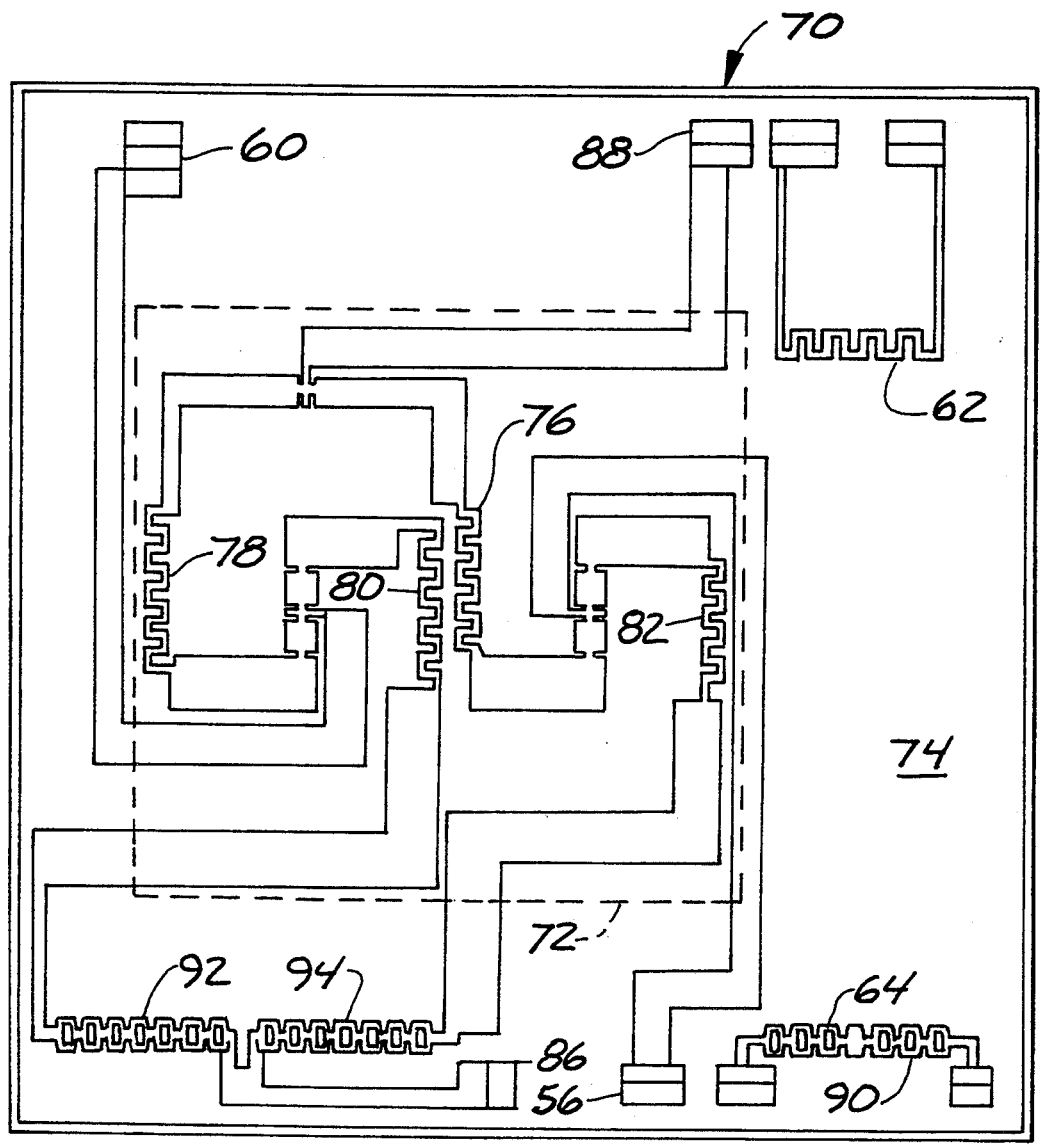
FIG. 3 is a plan view of a pressure sensor useable with the present invention.

A homogenous, substantially flat semiconductor substrate 70, shown in detail in FIG. 3, includes both a deflectable portion 72, for supporting the bridge circuit, and a relatively non-deflectable or rigid portion 74. In FIG. 3, the pressure sensor 12 comprises four pressure sensitive resistors, a first resistor 76, a second resistor 78, a third resistor 80 and a fourth resistor 82, electrically coupled in a conventional Wheatstone bridge circuit and supported on the monolithic silicon substrate 70. The pressure sensitive resistors are configured in a known manner such that the resistance of both the first resistor 76 and the third resistor 80 increases as the pressure exerted on the pressure sensor 12 increases while the resistance of both the second resistor 78 and the fourth resistor 82 decreases as the pressure exerted on the pressure sensor 12 increases. The resistance of each of the pressure sensitive resistors is approximately equal when no pressure is exerted on the pressure sensor 12.

The silicon substrate 70 further supports both the first and second gain-setting resistors, 62, 64, on the relatively non-deflectable portion 74 of the substrate 70, for setting the gain of the third amplifier 34 as described in detail below. Non-deflectable portion 74 supports the gain-setting resistors 62, 64 so that in use they are relatively unaffected by movement of deflectable portion 72 and therefore, insensitive to applied pressure. Of course, FIG. 3 is illustrative and other arrangements of the elements thereon can be used with the present invention. Preferably, all of the resistors of the pressure sensor 12 are thin film resistive elements made of polysilicon.

In operation, the voltage reference 45 provides a reference voltage, $V_{ref}$, to the non-inverting input 38 of the first amplifier 30, which provides a driving potential, $V_{drive}$, at output 46 of the first amplifier 30. The drive potential causes a bridge current, $I_{bridge}$, to flow through the sense resistor 36 and a constant drive potential, $V_{bridge}$, to be applied at a third node 86 of the bridge circuit. The flow of electrical current through the sense resistor 36 increases until $V_{bridge}$ equals $V_{ref}$ at which point output 46 of the first amplifier 30 stabilizes. The high open loop gain of first amplifier 30 assures $V_{bridge}$ will be held constant at the value of $V_{ref}$. The bridge current will flow through the bridge circuit from the third node 86 to a fourth node 88 which is electrically coupled to a reference potential node. For the embodiment shown, the electrical grounding is provided by a standard chassis reference connection to the metal skin and support structures of an air vehicle. Because $V_{bridge}$ is held constant, $I_{bridge}$ varies with the effective bridge resistance $R_{bridge}$, which is temperature dependent and approximated as follows:

$$R_{bridge} = \frac{(R_{76} + R_{78})(R_{80} + R_{82})}{(R_{76} + R_{78} + R_{80} + R_{82})}$$

The sense resistor 36 provides a voltage drop across the inputs 50, 52 of the second amplifier 32 proportional to $I_{bridge}$. The second amplifier 32 amplifies the voltage drop and provides a temperature signal $V_{temp}$ at its output 66 inversely proportional to the effective bridge resistance, $R_{bridge}$.

As shown, the pressure sensitive resistors 76, 78, 80, 82 typically have a temperature coefficient of resistance (TCR) of about 1200 ppm/°C. Therefore, the sense resistor 36 need only have a relatively low TCR in comparison to the pressure sensitive resistors to ensure that the sense resistor 36 accurately reflects the current, $I_{bridge}$, flowing through the bridge. Accordingly, assuming a pressure sensitive TCR of 1200 ppm/°C., a TCR of 30 ppm/°C. for the sense resistor 36 will not adversely affect the performance of the illustrated embodiment of the present invention. As a result, $V_{temp}$ provides an accurate indication of the average temperature of the pressure sensitive resistors 76, 78, 80, 82.

As described above, an increase in the pressure applied to the pressure sensor 12 increases the electrical resistance of the first and third resistors 76, 80 and decreases the electrical resistance of the second and fourth resistors 78, 82. This variation in resistance induces equal and opposite electrical potential changes at the first node 56 and the second node 60. These electrical potential changes couple to the third amplifier 34 which amplifies the voltage differential according to the gain equation: Gain=20($R_{62}/R_{64}$). The third amplifier 34 provides the resulting pressure signal, $V_{press}$, at its output 68.

The analog signals $V_{temp}$ and $V_{press}$ are provided to an analog-to-digital converter contained in signal processing circuitry 14 which provides digital signals to microcomputer system 18 which calculates a corrected pressure signal, $P_{corr}$, using the following equation shown in matrix notation:

CorrectedPressure =

$$[1 \, V_p \, V_p^2 \, V_p^3] \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix} \begin{bmatrix} 1 \\ V_t \\ V_t^2 \\ V_t^3 \end{bmatrix}$$

Where $V_p$ and $V_t$ are defined as follows:

$$V_p = \frac{V_{pres}}{V_{ref}} \quad V_t = \frac{V_{temp}}{V_{ref}}$$

The coefficients comprising matrix M are calculated at final assembly of the pressure sensor circuit 10 and stored in the non-volatile memory 20 for access and use by the microcomputer system 18. These coefficients are generated by monitoring the pressure sensor 12 during step changes of temperature and pressure as is known in the art. The digital circuitry operates to improve the pressure measurement accuracy by approximately an order of magnitude, from approximately 1-2% of full scale pressure error to 0.1% of full scale pressure error.

In the illustrated embodiment, the pressure sensitive resistors each have resistance values of 10 kΩ, the first gain-setting resistor 62 has a value of approximately 10 kΩ, the second gain-setting resistor 64 has a value of approximately 3kΩ and the sense resistor has a value of 1 kΩ. Thus, in the preferred embodiment, the third amplifier 34 has a gain of approximately 60, and the output voltage signal for $V_{temp}$ varies from 1.8 to 2 volts and $V_{press}$ varies from 0.25 to 2.25 volts direct current.

While the entire bridge current is shown as passing through the sense resistor 36, it is possible to design the signal processing circuitry 14 so that only a fixed or selected portion of the current flowing through the bridge passes through the sense resistor 36.

In FIG. 3, the second gain-setting resistor 64 can contain a trimming ladder 90 which is adjustable to provide coarse correction for pressure sensitivity differences between pressure sensors. Following this adjustment, which is usually made at wafer level during manufacture, substantially the same processed output results for the same pressure change affecting a given batch or group of pressure sensors. This method of gain adjustment in combination with a zeroing adjustment at a selected pressure results in interchangeability of pressure sensors without the need for re-calibration of the signal processing circuitry 14. As shown, zero adjustment of the pressure sensor 12 occurs by trimming dual input resistors 92, 94 so that the bridge circuit balances in the absence of applied pressure.

The term "pressure sensitivity ratio" as used herein represents the ratio of a change in the amplitude of an output of the pressure sensor 12 to a change of applied pressure at a given reference voltage. The coupling of the first and second gain-setting resistors 62, 64 to the third amplifier 34 results in the factory-set pressure sensitivity ratio being stable over a broad temperature range. The first and second gain-setting resistors 62, 64 are formed for example by thin film deposition, doping or other conventional techniques and are preferably formed simultaneously on the same silicon substrate as pressure sensitive resistors 76, 78, 80, 82. Simultaneous fabrication of these circuit components provides nearly identical temperature tracking performance among all the resistors, particularly with respect to temperature and the effects of aging and use over long periods of time. Furthermore, although not shown in the Figures, the gain-setting resistors 62, 64 may be deposited close together to optimize linear gain of the third amplifier 34.

Measuring temperature changes affecting the bridge circuit by sensing variations in the current flowing through the bridge circuit requires no separate temperature detector such as a thermistor. The error which results from the inherent phase lag of such detectors under dynamic conditions is eliminated. Additionally, the present invention provides a simultaneous measurement of temperature variations and pressure, even under dynamic temperature conditions and the illustrated embodiment performs as designed from −55° C. to 85° C. and under continually varying acceleration forces. Although not shown, a single 5 volt source could energize the pressure sensor circuit 10, further reducing the cost and complexity of the present invention.

Although the present invention has been described with referenced to preferred embodiments, workers skilled in the art will recognize that changes may be made in form and detail without departing from the spirit and scope of the invention.

What is claimed is:

1. A pressure sensor comprising:
    a resistive bridge circuit having output terminals for providing a pressure output signal and power terminals for receiving power;
    power supply means for providing power to the resistive bridge circuit at a substantially constant voltage across the power terminals such that temperature caused variations in the resistance of the bridge circuit are reflected in the current flowing through the resistive bridge circuit;
    a resistive element having a first end electrically coupled to the bridge circuit and having a second end electrically coupled to the power supply to carry at least a known portion of the current through the bridge circuit; and
    a first amplifier electrically coupled to the resistive element for amplifying the voltage drop across the resistive element to provide a temperature output signal.

2. The apparatus of claim 1 wherein the resistive bridge circuit comprises four pressure sensitive resistors electrically coupled to form a Wheatstone bridge circuit.

3. The apparatus of claim 2 wherein the pressure sensitive resistors are deposited on a semiconductor substrate.

4. The apparatus of claim 2 wherein the first amplifier has an inverting input electrically coupled to the first end of the resistive element and a non-inverting input electrically coupled to the second end of the resistive element.

5. The apparatus of claim 4 and a second amplifier having a non-inverting input electrically coupled to the power supply, an inverting input electrically coupled to the first end of the resistive element and an output electrically coupled to the second end of the resistive element.

6. The apparatus of claim 5 and a third amplifier having both a non-inverting input and an inverting input electrically coupled to the resistive bridge circuit for amplifying the pressure output signal.

7. The apparatus of claim 6 and a first pressure insensitive resistor and a second pressure insensitive resistor electrically coupled to the third amplifier for setting the gain.

8. The apparatus of claim 7 wherein the pressure sensitive resistors, the first pressure insensitive resistor and the second pressure insensitive resistor are deposited on a single semiconductor substrate.

9. The apparatus of claim 6 and computer processing means electrically coupled to both the first amplifier and the third amplifier for calculating a corrected pressure value based on the output of the first and third amplifiers.

10. A method for measuring the temperature of a pressure sensor having a resistive bridge circuit for providing a pressure output signal and having a power source for supplying a current to flow through power terminals of the bridge circuit, the method comprising the steps of:

providing a resistive element coupled between the power source and the resistive bridge circuit to carry at least a known portion of the current flowing through the bridge circuit;

maintaining a substantially constant voltage across the power terminals such that temperature caused variations in the resistance of the bridge circuit are reflected in the current flowing through the resistive bridge circuit; and measuring the voltage drop across the resistive element.

11. The method of claim 10 and the further step of amplifying the voltage drop across the resistive element to create a temperature output signal.

12. The method of claim 11 and the further step of utilizing the temperature output signal to correct the pressure output signal for variations in the temperature of the pressure sensor.

* * * * *